United States Patent
Savir et al.

(10) Patent No.: US 10,990,284 B1
(45) Date of Patent: Apr. 27, 2021

(54) ALERT CONFIGURATION FOR DATA PROTECTION

(71) Applicant: EMC IP Holding Company LLC, Hopkinton, MA (US)

(72) Inventors: Amihai Savir, Sansana (IL); Shai Harmelin, Haifa (IL); Anat Parush Tzur, Hanegev (IL); Idan Levy, Kadima-Zoran (IL); Roi Gamliel, Tkuma (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 239 days.

(21) Appl. No.: 15/282,878

(22) Filed: Sep. 30, 2016

(51) Int. Cl.
*G06F 3/06* (2006.01)
*G06F 11/30* (2006.01)
*H04L 29/06* (2006.01)

(52) U.S. Cl.
CPC ............ *G06F 3/0605* (2013.01); *G06F 3/065* (2013.01); *G06F 3/067* (2013.01); *G06F 3/0653* (2013.01); *G06F 11/3006* (2013.01); *G06F 11/3034* (2013.01); *G06F 11/3051* (2013.01); *G06F 11/3072* (2013.01); *H04L 63/20* (2013.01)

(58) Field of Classification Search
CPC ............................... G06F 3/0653; G06F 11/30
See application file for complete search history.

(56) References Cited

U.S. PATENT DOCUMENTS

| 8,112,661 B1* | 2/2012 | La France | G06F 11/2069 |
| | | | 714/42 |
| 10,083,094 B1* | 9/2018 | Thomas | G06F 11/1461 |
| 2003/0135609 A1* | 7/2003 | Carlson | G06F 9/5011 |
| | | | 709/224 |

(Continued)

OTHER PUBLICATIONS

Smith, et al., A Comparison of Time Series Model Forecasting Methods on Patent Groups, As published in the Proceedings of the 26th Modern AI and Cognitive Science Conference (MAICS 2015), vol. 1353, Paper 13, Greensboro, NC, USA, Apr. 25-26, 2015.

(Continued)

*Primary Examiner* — Charles Rones
*Assistant Examiner* — Tian-Pong Chang
(74) *Attorney, Agent, or Firm* — Womble Bond Dickinson (US) LLP (57) ABSTRACT

An alert configuration system facilitates accurate and reliable configuration of alerts for data protection policy in a data protection system, including eliminating or reducing manual configuration of data protection policy. The system identifies risks through trend analysis and behavioral statistics as applied to historical data, and automatically configures alerts for the identified risks so that alerts are generated upon detection of the identified risks. After detecting differences between tracked values for a data protection system and predicted values obtained through trend analysis and behavioral statistics as applied to the historical data, the alert configuration system automatically adjusts the configuration of alerts for data protection policy in accordance with the predicted values. The tracked and predicted values include (Continued)

attributes of a data protection system embodied in key performance indicators associated with the identified risks based on the trend analysis and behavioral statistics as applied to historical data.

15 Claims, 5 Drawing Sheets

(56) References Cited

U.S. PATENT DOCUMENTS

| | | | | |
|---|---|---|---|---|
| 2010/0123575 | A1* | 5/2010 | Mittal | H04L 41/0609 340/540 |
| 2011/0016088 | A1* | 1/2011 | Spackman | G06F 11/3428 707/637 |
| 2012/0079326 | A1* | 3/2012 | Riegel | G06F 11/008 714/38.1 |
| 2012/0089572 | A1* | 4/2012 | Raichstein | G06F 16/174 707/645 |
| 2014/0181982 | A1* | 6/2014 | Guo | G06F 21/60 726/25 |
| 2015/0310213 | A1* | 10/2015 | Ronen | G06F 21/57 726/22 |
| 2015/0341211 | A1* | 11/2015 | Saha | H04L 41/0823 709/221 |
| 2017/0185436 | A1* | 6/2017 | Deng | G06F 9/45558 |

OTHER PUBLICATIONS

Prajakta S. Kalekar, Time series Forecasting using Holt-Winters Exponential Smoothing, Kanwal Rekhi School of Information Technology, Dec. 6, 2004.

EMC Data Protection Advisor 6.2 SP1 Installation and Administration Guide, Ch. 4, pp. 158-173, published Mar. 2015.

* cited by examiner

ALERT CONFIGURATION FOR DATA PROTECTION

FIELD OF THE INVENTION

Embodiments of the present invention relate generally to data storage systems. More particularly, embodiments of the invention relate to data protection systems for data storage.

BACKGROUND

Data storage systems rely on protection management software to generate alerts when a risk is identified in data protection operations. For example, protection management software generates alerts when a backup is larger than average in a particular time window or when backup failures exceed a particular threshold.

Some protection management and monitoring software, such the data protection management software provided by © 2016 EMC Corporation, allow a system administrator to manually configure a set of rules that trigger such alerts. However, tuning a manually configured set of rules for optimal protection and performance of the data storage system is time consuming. Moreover, tuning a rule that is not well configured can expose the data protection operations of the data storage system to greater risk.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A data protection management system applies rules to various measurements, or metrics, of protection operations, and generates alerts when indicated after application of the rules. In EMC's Data Protection Advisor (DPA) management software, for example, a system administrator manually configures rules by selecting which types of rules to apply to particular measurements. The system administrator selects the particular measurements, referred to as key performance indicators, from tens of thousands of different metrics for measuring the performance of various protection operations.

The manual configuration of rules requires the system administrator to choose the rule (e.g. event, change control, conditions filter, inventory change, and so forth), and the attribute/key performance indicator to which the rule applies (e.g. event duration, start time, event failure, low inventory). In addition the system administrator manually configures parameters and parameter values for the rules. An example of typical rules, parameters and values is shown in Table 1.

TABLE 1

Example rules, parameters, type, values, default values

| Rule Name | Parameter | Type | Value | Default Value |
|---|---|---|---|---|
| Backup larger than average time for window | Days of History | Duration | 2 weeks | 2 Weeks |
| Backup larger than average time for window | Deviation | Percentage | 50 | 50 |
| Filesystem filling up | Number of hours to forecast | Duration | 12 Hours | 12 Hours |
| Filesystem filling up | Maximum predicted utilization | Percentage | 90 | 90 |
| Filesystem filling up | Hours to gather data | Duration | 4 Days | 4 Days |
| Backup failed many times | Number of backups to count | Numeric | 3 | 3 |
| Backup failed many times | Maximum failures | Numeric | 2 | 2 |

Manually configuring rules is time consuming and requires expertise on the part of the system administrator. For example, the system administrator must not only select which attributes, or key performance indicators, to track, but also the parameters for applying the rule to the selected attribute. Proper selection of the rules, the attributes as well as the parameters for applying the rules requires a deep understating of the operating environment, the protection operations and the behavior of the data protection system. For example, setting the right thresholds for a specific attribute is not a trivial task and it may require several trial iterations before a rule is successfully configured.

Because manual configuration is time consuming, complex and prone to error, another challenge is the generation of false alerts from improperly configured or outdated configurations of the rules. Operating conditions of a data protection system can change quickly, requiring adjustment of the rules "on the fly." Delays in adjustments to the configuration of the rules can degrade performance and adherence to service level agreements, or unnecessarily tax the system administrators with identifying the false alerts. Even worse, a customer may suffer from false negative alerting by missing critical events or receiving other misinformation that can result in a significant loss of protection for their data.

Therefore, because configuring and editing protection policy can require the customer and professional services to expend months of expert time, manual configuration not only drives up adoption costs, but also enables customers to configure risky policies that will miss important events and decrease total customer experience.

To address these challenges, embodiments of an alert configuration system as herein described facilitate accurate and reliable configuration of alerts for data protection policy, including eliminating manual configuration, identifying risks through trend analysis and behavioral statistics as applied to historical data, and configuring alerts for the identified risks so that alerts are generated upon detection of the identified risks. Data protection policy can include any collection of data about how backup and replication should operate in a given storage system environment.

In one embodiment, configuring alerts for the identified risks includes configuring alerts in accordance with user preferences, but without manual configuration. For example, in one embodiment, the alert configuration system preserves customized alerting behavior for each operating environment by learning a customer's specific data protection system characteristics using anomaly detection.

In one embodiment, anomaly detection in the alert configuration system includes comparing learned characteristics of a customer's data protection system to actual characteristics, and detecting differences between them.

In one embodiment, anomaly detection in the alert configuration system is performed in a processor configured with attribute monitor logic to track attributes in a storage repository, a time series model having logic to generate predicted parameter values for the tracked attributes, and an alert manager to determine whether to generate an alert based on the actual parameters values for tracked attributes as compared to the predicted parameter values for those tracked attributes.

In one embodiment the attribute monitor logic tracks some attributes and not others depending on the identified risks for each customer's operating environment, resulting in actual parameter values for the tracked attributes.

In one embodiment the time series model includes any one of a plurality of models applied to collected metrics in the historical data to derive predicted parameter values for the tracked attributes.

In one embodiment, an alert manager logic determines whether to generate an alert based on the anomalies, i.e. differences, detected when comparing the predicted parameter values derived from the time series model to the actual parameter values for any one or more tracked attributes.

In one embodiment, the alert configuration system further includes user-controlled configuration parameter to control the sensitivity and specificity of the generated alerts.

In this manner, an alert configuration system enables data protection administrators to build an automated, adaptable and customized alerting service for a customer to meet and even exceed data protection service level commitments and otherwise improve customer experience.

Figure 1:
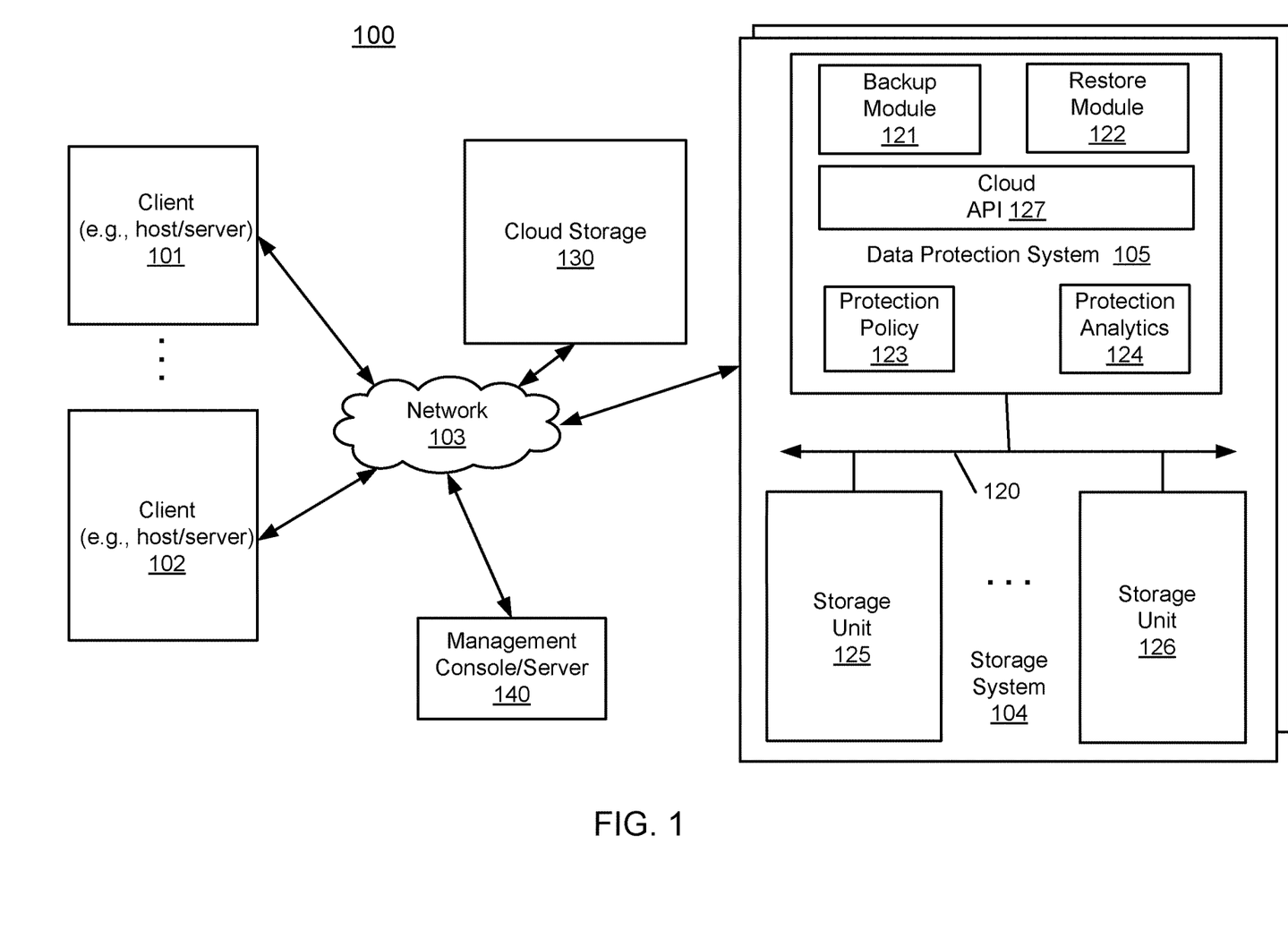
FIG. 1 is a block diagram illustrating an overview of an operating environment of a data protection system according to one embodiment of the invention.

FIG. 1 is a block diagram illustrating an alert configuration system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, data protection system 105 (also referred to as data protection logic, data protection manager, etc. which may be implemented in software, hardware, or a combination thereof), including a protection policy repository 123 and protection analytics logic 124 communicatively coupled to a cloud storage application programming interface (API) 127, and backup and restore modules 121/122 and one or more storage units or devices 125-126.

Storage system 104 may represent any storage service related components configured or adapted to provide storage services (e.g., storage as a service) to a variety of clients using any of the access protocols set forth above. For example, storage system 104 may include the backup module 121, restore module 122 and cloud API 127, for providing storage services for cloud-enabled storage 130, including backing up and restoring data stored in the cloud.

In one embodiment, backup logic 121 is configured to receive and back up data from a client (e.g., clients 101-102) and to store the backup data in any one or more of storage units 125/126 or in a cloud storage 130. Restore logic 122 is configured to retrieve and restore/reconstruct backup data from any one or more of storage units 125/126, or from cloud storage 130 in conjunction with cloud API 127 as explained in further detail below. The restored/reconstructed data is sent back to a client (e.g., clients 101-102).

Storage units 125/126 may be implemented locally (e.g., single node operating environment) or remotely (e.g., multi-node operating environment) via interconnect 120, which may be a bus and/or a network (e.g., a storage network or a network similar to network 103). Storage units 125/126 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 125/126 may be located locally or remotely accessible over a network, including being located in cloud-enabled storage 130.

Figure 2:
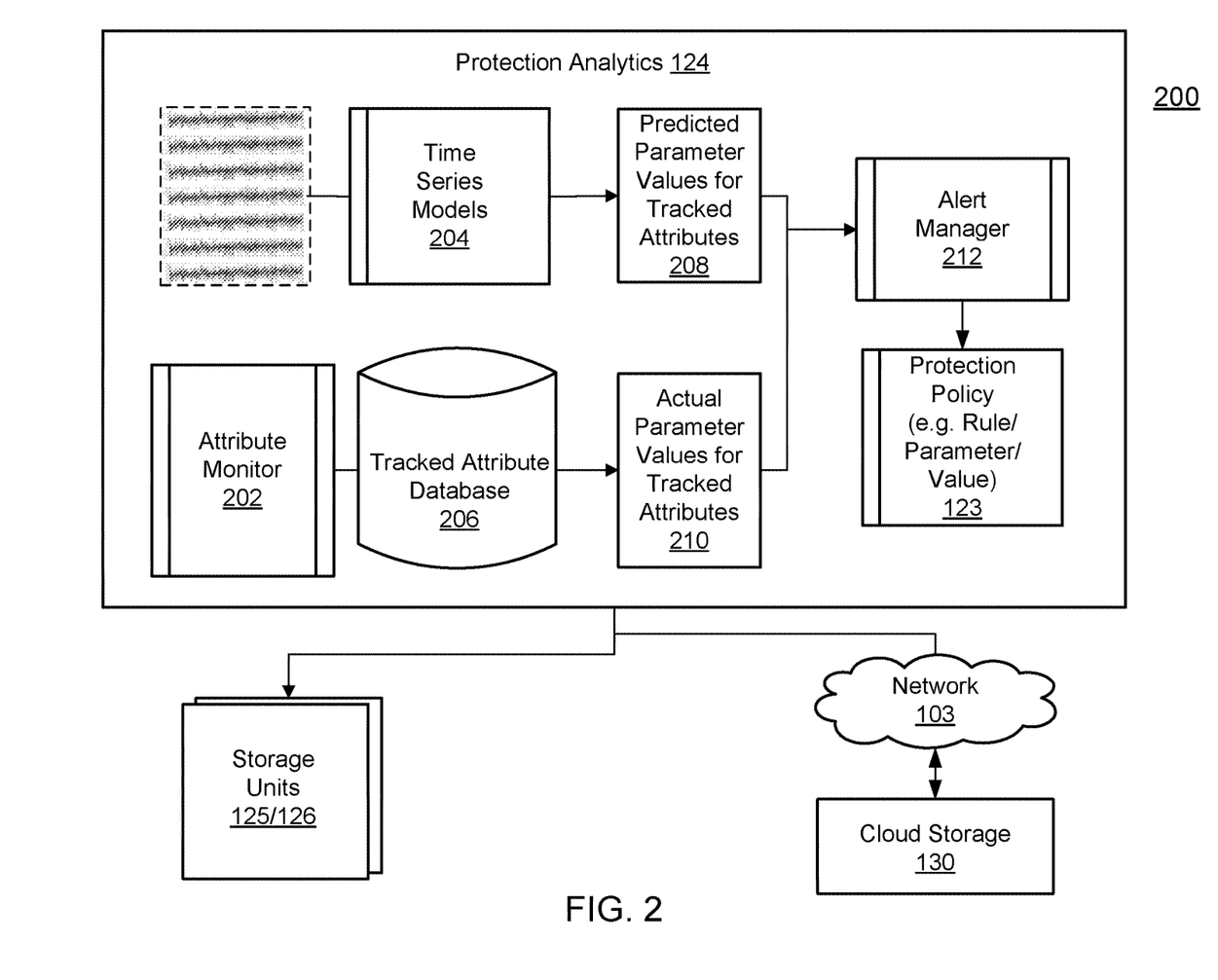
FIG. 2 is a block diagram illustrating a protection analytics and protection policy components of a data protection system in further detail according to one embodiment of the invention.

In response to a data file being synchronized to cloud storage 130, stored in storage units 125/126 or restored from cloud storage 130 and/or storage units 125/126, according to one embodiment, the protection analytics component 124 of data protection system 105 contains logic to identify data protection system risks, configure the alerts that should be generated to warn of the presence of the identified risks, and to generate the alerts should the identified risks materialize during operation of the data protection system 105, all of which is described in further detail with reference to FIG. 2.

In one embodiment, storage system 104 further includes a storage manager or storage controller (not shown) configured to manage storage resources of storage system 104, such as, for example, storage space and processing resources (e.g., processor, memory, network resources) in addition to the aforementioned data protection system 105, protection policy files 123 and protection analytics module 124. An administrator of management console or server 140 may access the storage manager or controller remotely via a management or configuration interface (not shown).

In addition to overseeing the alert configuration features described herein of the data protection system 105, protection policy 123 and protection analytics module 124, the administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

FIG. 2 is a block diagram illustrating further details of a storage system 200 including storage system 104 having the protection analytics module 124 and protection policy repository 123 on which is stored, among other data, a collection of the rules, parameters and values, that make up the protection policy for a given storage system operating environment. As shown, an attribute monitor 202 operates in real-time to monitor any number of attributes that contain different key performance indicators (i.e., parameters).

In one embodiment, the status of each parameter is recorded and saved into a tracked attribute database 206. The selection of which attributes to monitor, or track, can be influenced in part by the prior application of one or more time series models 204 to historical data representative of the actual operation and performance of the data protection features of the data protection system 105/storage system 104. The attributes can vary depending on the type of hardware employed in the storage system and can be proprietary attributes captured by a particular storage technology vendor, or standard attributes reported uniformly across different vendor storage systems. Regardless of the source, the attributes tracked by attribute monitor 202 and identified in time series models 204 represent key performance indicators that, when properly modeled, provide predicted parameter values 208 useful in detecting anomalous conditions.

In one embodiment, the time series models 204 operate to constantly build and update a time series predictive model for the tracked attributes' parameters. Different time series models 204 can be employed, and include such well-known time series modes such as Holt-Winter forecasting model, a type of exponential smoothing model for forecasting behavior, or an autoregressive integrated moving average (ARIMA) forecasting model. The models are fitted to time series data collected over time, such as historical data recorded as a series of data points at successive points in time, usually at regular intervals. The time series models 204 are applied to the historical data recorded for the particular operating environment, and predicts the expected status of the data recorded for curtain tracked attributes in the future, including near future or subsequent future time.

In one embodiment, the time series models 204 advantageously discover trends and seasonality patterns in the usage of different attributes. For example, for the attribute entitled "backup larger than average in time window," instead of choosing a fixed value for the parameter "the days of history," the model, using artificial intelligence, discovers which time slots influence the current size of backup.

In one embodiment, the time series models 204 operate on historical data during a training phase to establish a baseline of operating environment behavior in which the historical data is captured over a significant period of time. Once the baseline behavior is established and the risks for the particular operating environment are identified, then the attributes for best identifying those risks are tracked to predict future behavior. Because of their predictive abilities, the models can be used to aid in the automated configuration of the protection policy by generating the predicted parameter values 208 corresponding to the various tracked attributes.

In one embodiment, an alert manager 212 is configured to compare predicted parameter values for the tracked attributes 208 to the actual parameter values for tracked attributes 210 as recorded and stored in the tracked attribute database 206. The alert manager 212 uses the comparisons to decide whether to update the protection policy rules, parameters and values repository 123 such that alerts are generated in accordance with the differences between the predicted parameter values and the actual parameter values for any one or more tracked attributes 210, i.e. in accordance with the detected anomalies.

Figure 3:
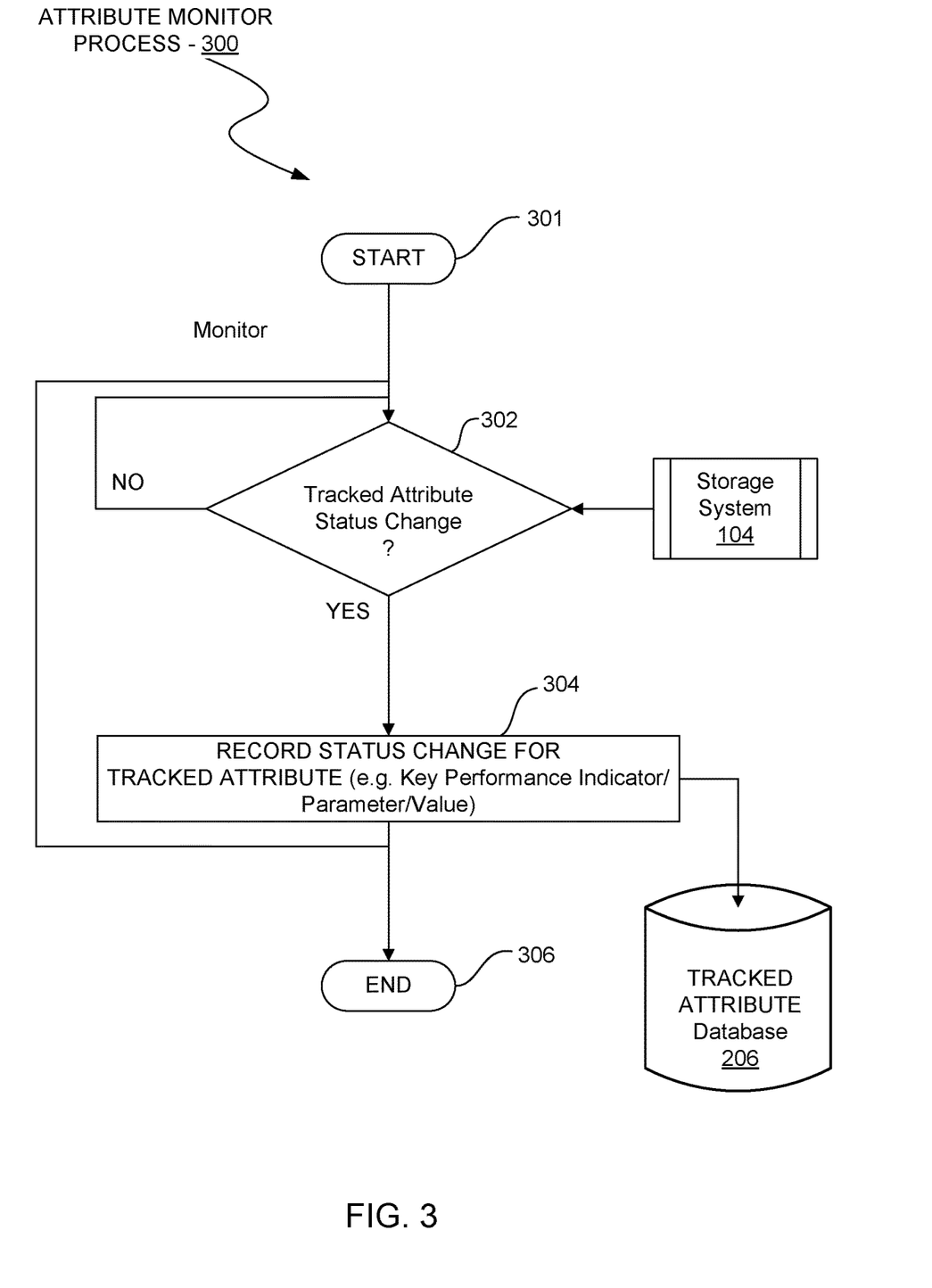
FIG. 3 is a flow diagram illustrating processes for an attribute monitor in a data protection system according to one embodiment of the invention.
Figure 4:
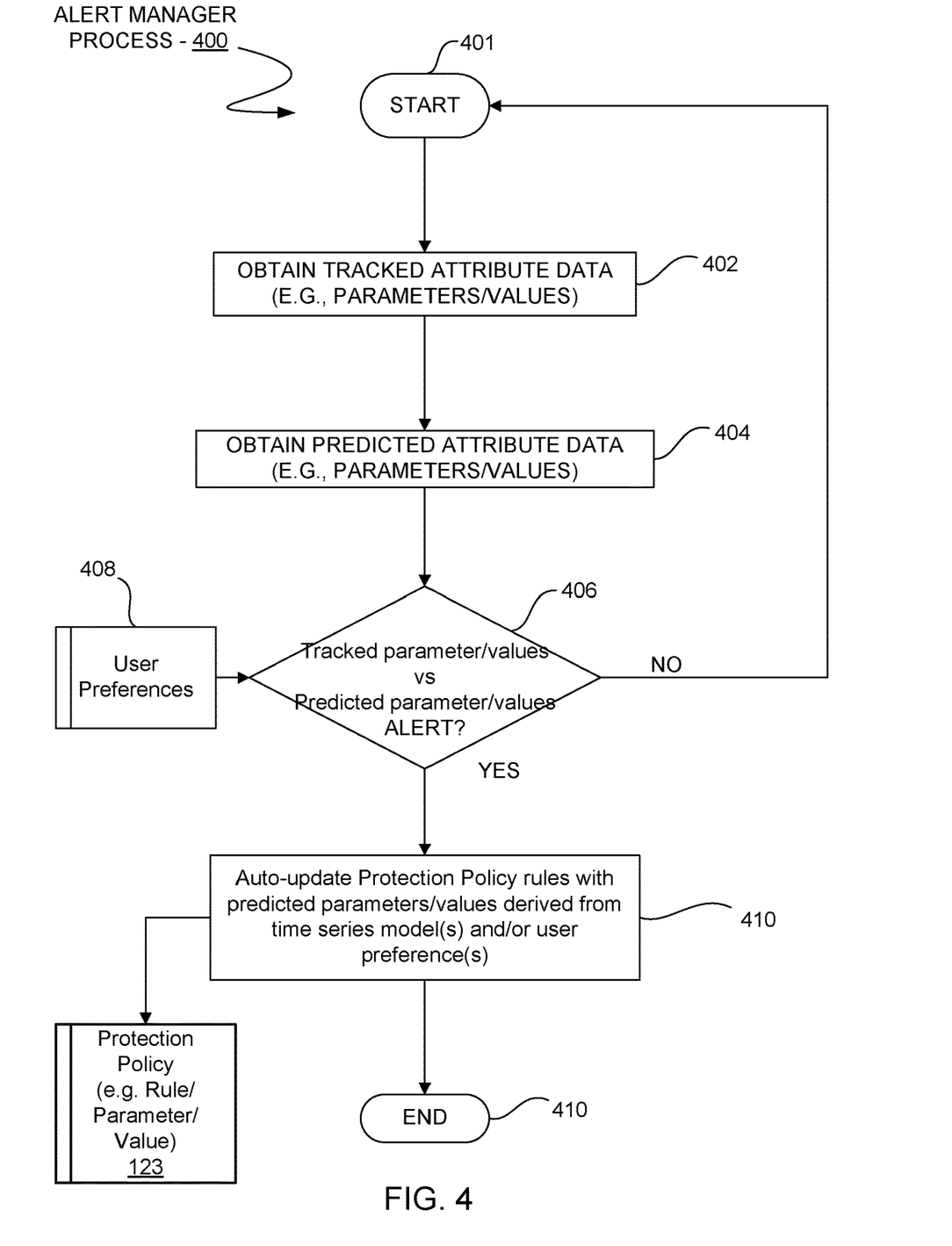
FIG. 4 is a flow diagram illustrating processes for a alert manager in a data protection system according to one embodiment of the invention.

FIGS. 3-4 are flow diagrams illustrating processes 300/400 for monitoring or tracking attributes 300 and managing alerts 400. Processes 300/400 may be performed by processing logic that includes hardware (e.g. circuitry, dedicated logic, etc.), software (e.g., embodied on a non-transitory computer readable medium), or a combination thereof. For example, the data protection system 105, including the protection analytics module 124, could API 123, backup and restore modules 121/122 as illustrated in FIGS. 1 and 2, can perform processes 300/400, and can be embodied in hardware or software or a combination thereof.

With reference to the embodiment illustrated in FIG. 3, the attribute monitor process 300 begins 301 at decision block 302 by detecting whether one of the tracked attributes has a status change. The choice of which attributes to track is pre-determined through identifying risks based on historical data analysis of storage system 104, and associating those attributes most likely to aid in anticipating the identified risks. For example, the identified risk of the size of backups exceeding the space allotted to them can be anticipated by tracking attributes such as the "backup larger than average in time window" or the "days of history" stored in any single backup.

At process block 304, the attribute monitoring process concludes 306 after recording status changes in the tracked attribute database 206 for any tracked attributes for which a status change has been detected. The database can be any storage repository capable of storing the status changes so that the parameter values, e.g. the actual values of the key performance indicators that represent particular attributes, are easily and efficiently accessible by tracked attribute identification.

With reference to the embodiment illustrated in FIG. 4, the alert manager process 400 starts 401 at process block 402 by obtaining tracked attribute data, such as parameter values for key performance indicators that have been previously recorded, such as in attribute monitor process 300. The alert manager process 400 continues at process block 404 by obtaining predicted attribute data for the same tracked attributes, e.g. the predicted values of the key performance indicators that represent particular attributes. The predicted values are updated continuously or at certain intervals through the above-described application of the time series models 206 to the historical data for the storage system 104, including the historical data accumulated in the tracked attribute database and/or a comprehensive database of key performance indicators that comprise the tracked attributes being monitored.

In one embodiment, the alert manager process 400 continues at decision block 406 to compare the tracked or actual parameter values to the predicted parameter values. Should a difference be detected, the alert manager process proceeds to generate a new alert configuration at process 410 in which the protection policy rules, parameters and values 123 are automatically adjusted to reflect the predicted parameter values instead of whatever prior parameter values for alert generation were in use before the differences were detected. In one embodiment, the alert manager process 400 takes into account the previously provided user preferences 408 when determining whether to automatically adjust the protection policy rules, parameters and values 123 as indicated by the detected differences in tracked vs. actual parameter values.

Once updated using the alert configuration process 400, the data protection system 105 enforces the protection policy 123 reflected in the automatically adjusted rules, parameters and values. The processes of alert configuration 400 and attribute monitoring 300 continue indefinitely so that the data protection system 105 enforces the best possible protection policy 123 as reflected in the automatically adjusted rules, parameters and values.

Figure 5:
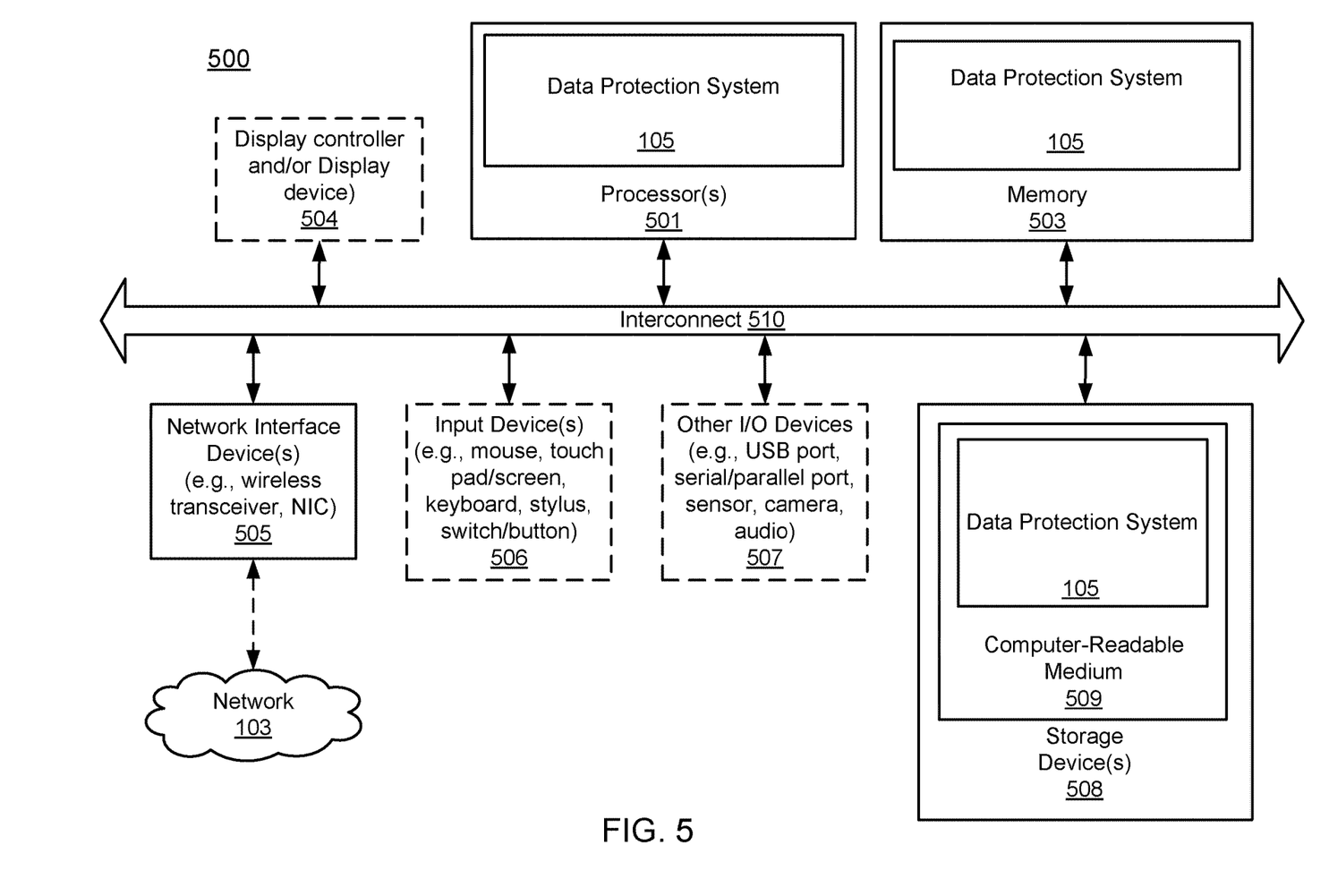
FIG. 5 is a block diagram illustrating a general overview of a data processing system environment for providing a data protection system according to one embodiment of the invention.

FIG. 5 is a block diagram illustrating an example of a data processing system 500 that may be used with one embodiment of the invention. For example, system 500 represents any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations and steps discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices 505-508, including network interface device(s) 505, optional input device(s) 506, and other optional IO device(s) 505. Network interface device 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with display device 504), a pointer device such as a stylus, and/or a keyboard (e.g., physical keyboard or a virtual keyboard displayed as part of a touch sensitive screen). For example, input device 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-accessible storage medium 509 (also known as a machine-readable storage medium or a computer-readable medium) on which is stored one or more sets of instructions or software (e.g., module, unit, and/or logic of any of the components of data protection system 105 and/or storage system 104) embodying any one or more of the methodologies or functions described herein. Module/unit/logic 104/105 may also reside, completely or at least partially, within memory 503 and/or within processor 501 during execution thereof by data processing system 500, memory 503 and processor 501 also constituting machine-accessible storage media. Module/unit/logic 104/105 may further be transmitted or received over a network via network interface device 505.

Computer-readable storage medium 509 may also be used to store the some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic of the storage system and data protection systems 104/105, components and other features described herein can be implemented as discrete hardware components or integrated in the functionality of hardware components such as ASICS, FPGAs, DSPs or similar devices. In addition, module/unit/logic 104/105 can be implemented as firmware or functional circuitry within hardware devices. Further, module/unit/logic 104/105 can be implemented in any combination hardware devices and software components.

Note that while system 500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems that have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for configuring data protection policy, the method comprising:
    applying, by a processor, a time series model to historical data for a data protection system, the historical data including data values recorded for attributes of the data protection system, the data values recorded over time;
    identifying, by the processor, risks associated with the attributes of the data protection system based on the application of the time series model to the data values recorded over time, the attributes containing key performance indicators of the data protection system including parameter values of the data protection system, the risks based on characteristics of the data protection system derived from the data values recorded for the attributes of the data protection system over time, the characteristics including the key performance indicators of the data protection system;
    generating, by the processor, predicted parameter values for the attributes of the data protection system for which risks have been identified; and
    adjusting, by the processor, data protection policy including any collection of data about how backup and replication should operate in a storage system environment for the attributes of the data protection system for which risks have been identified, including adjusting policy data values for backup and replication operation in the storage system environment in accordance with user preferences and the predicted parameter values.

2. The computer-implemented method of claim 1, wherein adjusting data protection policy includes:
    obtaining tracked data values;
    obtaining predicted data values;
    determining that a difference between the tracked data values and the predicted data values results in an identified risk; and
    updating policy data values in accordance with predicted values.

3. The computer-implemented method of claim 1, wherein the time series model is any one or more of an exponential smoothing model and an autoregressive integrated moving average (ARIMA) model.

4. The computer-implemented method of claim 1, wherein data values are the parameter values for key performance indicators of the data protection system.

5. The computer-implemented method of claim 1, wherein attributes of the data protection system include any one or more of parameters and values for a rule governing the data protection system.

6. A data processing system comprising:
    a first repository in which to store a data protection policy for a data protection system;
    a second repository in which to record historical data associated with the data protection system;
    a logic for a time series model for analyzing the recorded historical data;
    a processor in communication with the first and second repository and the memory, the processor configured to:
        apply the time series model to the historical data, the historical data including data values recorded for attributes of the data protection system, the data values recorded over time;
        identify risks associated with the attributes of the data protection system based on the application of the time series model to the data values recorded over time, the attributes containing key performance indicators of the data protection system including parameter values of the data protection system, the risks based on characteristics of the data protection system derived from the data values recorded for the attributes of the data protection system over time, the characteristics including the key performance indicators of the data protection system;
        generate predicted parameter values for the attributes of the data protection system for which risks have been identified; and
        adjust data protection policy including any collection of data about how backup and replication should operate in a storage system environment for the attributes of the data protection system for which risks have been identified, including adjusting policy data values for backup and replication operation in the storage system environment in accordance with user preferences and the predicted parameter values.

7. The data processing system of claim 6 wherein, to adjust data protection policy, the processor is configured to:
    obtain tracked data values;
    obtain predicted data values;
    determine that a difference between the tracked data values and the predicted data values results in an identified risk; and
    update policy data values in accordance with predicted values.

8. The data processing system of claim 6 wherein the time series model is any one or more of an exponential smoothing model and an autoregressive integrated moving average (ARIMA) model.

9. The data processing system of claim 6 wherein data values are the parameter values for key performance indicators of the data protection system.

10. The data processing system of claim 6 wherein attributes of the data protection system include any one or more of parameters and values for a rule governing the data protection system.

11. A non-transitory computer-readable storage medium having instructions stored therein, which when executed by a processor, cause the processor to perform operations for configuring data protection policy, the operations comprising:
- applying a time series model to historical data for a data protection system, the historical data including data values recorded for attributes of the data protection system, the data values recorded over time;
- identifying risks associated with the attributes of the data protection system based on the application of the time series model to the data values recorded over time, the attributes containing key performance indicators of the data protection system including parameter values of the data protection system, the risks based on characteristics of the data protection system derived from the data values recorded for the attributes of the data protection system over time, the characteristics including the key performance indicators of the data protection system;
- generating predicted parameter values for the attributes of the data protection system for which risks have been identified; and
- adjusting data protection policy including any collection of data about how backup and replication should operate in a storage system environment for the attributes of the data protection system for which risks have been identified, including adjusting policy data values for backup and replication operation in the storage system environment in accordance with user preferences and the predicted parameter values.

12. The non-transitory computer-readable storage medium of claim 10, the operations further comprising:
- obtaining tracked data values;
- obtaining predicted data values;
- determining that a difference between the tracked data values and the predicted data values results in an identified risk; and
- updating policy data values in accordance with predicted values.

13. The non-transitory computer-readable storage medium of claim 10 wherein the time series model is any one or more of an exponential smoothing model and an autoregressive integrated moving average (ARIMA) model.

14. The non-transitory computer-readable storage medium of claim 10 wherein data values are the parameter values for key performance indicators of the data protection system.

15. The non-transitory computer-readable storage medium of claim 10 wherein attributes of the data protection system include any one or more of parameters and values for a rule governing the data protection system.

* * * * *